J. C. NELSON.
SEAT SUPPORT FOR MOTOR CYCLES.
APPLICATION FILED FEB. 14, 1921.
1,419,294.
Patented June 13, 1922.
2 SHEETS—SHEET 1.
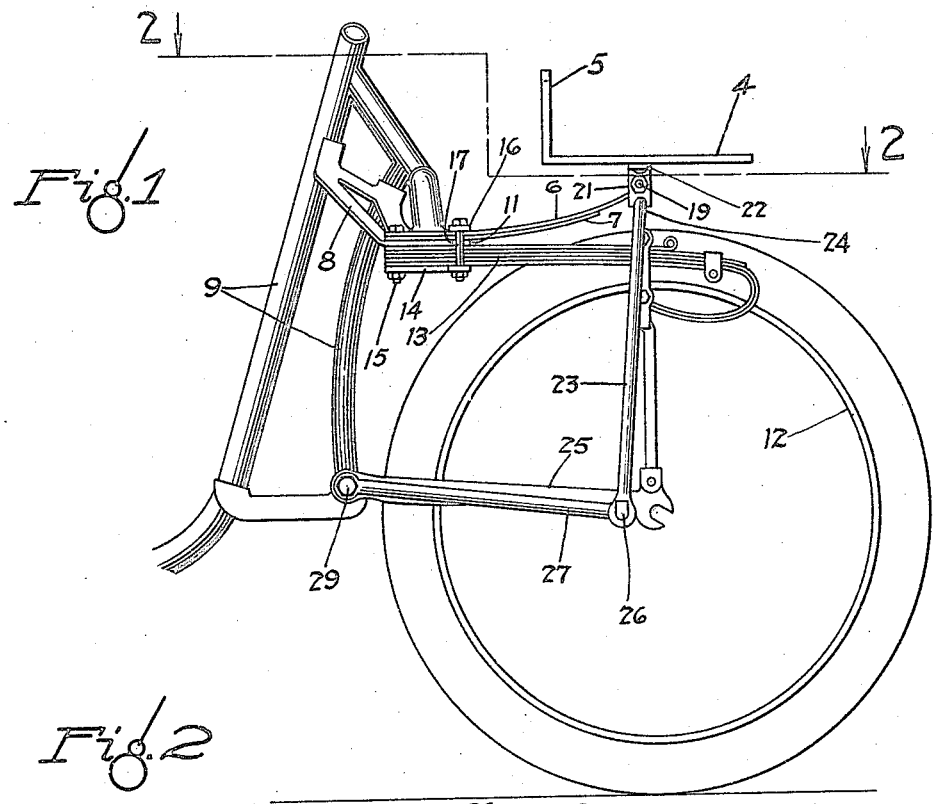
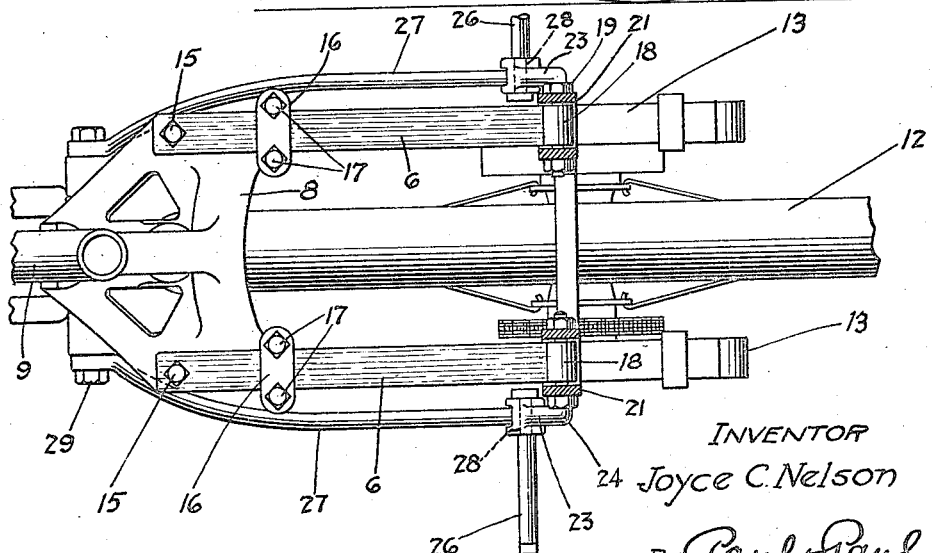
INVENTOR
Joyce C. Nelson
By Paul & Paul
His Attorneys

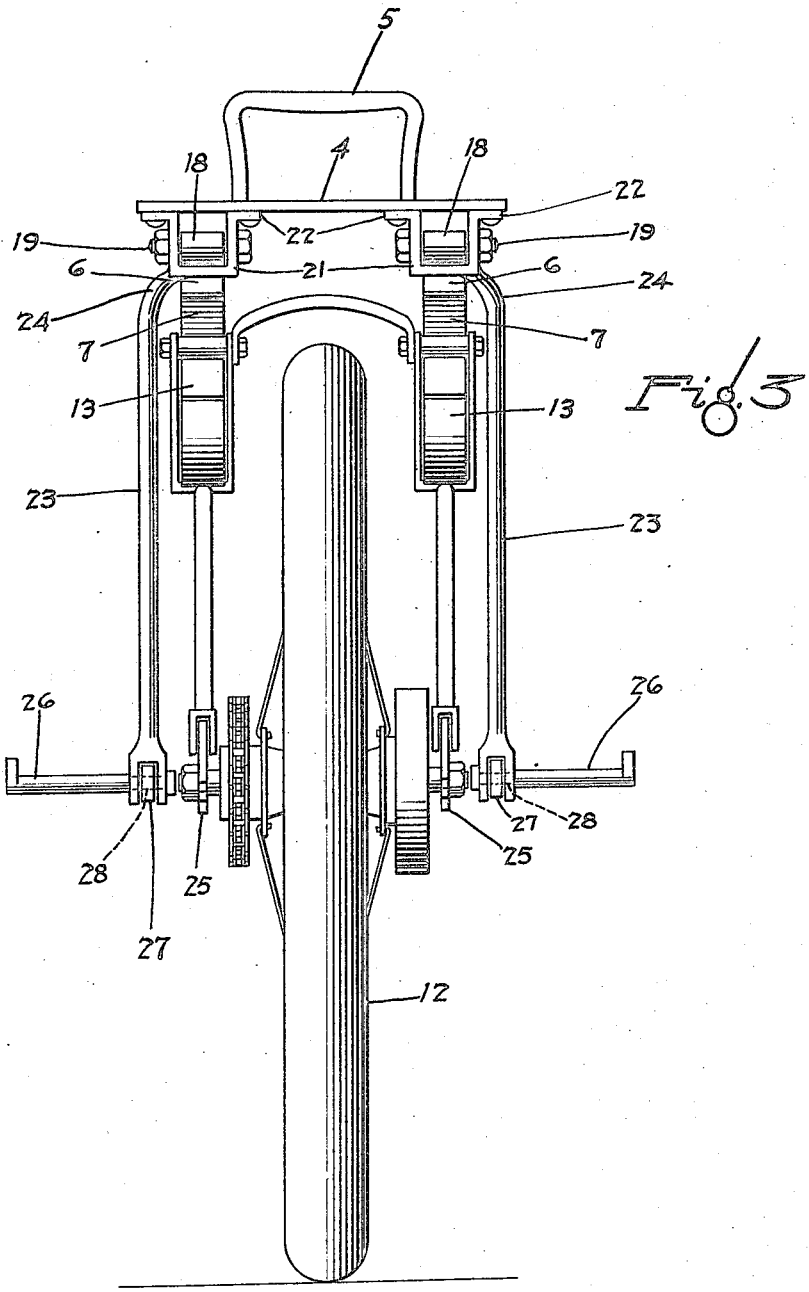

UNITED STATES PATENT OFFICE.

JOYCE C. NELSON, OF MINNEAPOLIS, MINNESOTA, ASSIGNOR OF ONE-SIXTH TO WALTER H. NELSON, ONE-SIXTH TO WILL N. NELSON, AND ONE-SIXTH TO SADIE A. VANDUSEN, ALL OF TRACY, MINNESOTA.

SEAT SUPPORT FOR MOTOR CYCLES.

1,419,294.  Specification of Letters Patent.  Patented June 13, 1922.

Application filed February 14, 1921. Serial No. 444,701.

*To all whom it may concern:*

Be it known that I, JOYCE C. NELSON, a citizen of the United States, resident of Minneapolis, county of Hennepin, State of Minnesota, have invented certain new and useful Improvements in Seat Supports for Motor Cycles, of which the following is a specification.

This invention relates to seat-supports particularly for use with motorcycles although it may also be employed in connection with bicycles and other vehicles wherever a seat of this character is required.

For purposes of disclosure of this invention, it is shown in connection with a present type of motorcycle in general use. The specific seat and seat-support here shown is adapted to be attached to a motorcycle frame to provide a seat supplemental or auxiliary to the usual operator's seat provided upon a motorcycle frame. This seat is resiliently supported at the rear of the main frame in such manner that it will yield sufficiently to relieve the person occupying the seat from undue jar resulting from the vibrations of the machine under working conditions.

The object of this invention is to provide an improved seat-support for motorcycles. Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown as various changes may be made within the scope of the claims which follow.

In the drawings:

Figure 1 is a view in side elevation of the novel seat-support as attached to the rear of a motorcycle;

Figure 2 is a section on the line 2—2 of Figure 1; and

Figure 3 is a view in rear elevation of the structure shown in Figure 1.

In this selected embodiment of the invention there is disclosed a seat mounted upon a resilient means attached in operative position to the rear of the main frame of a motorcycle and rearwardly extending therefrom. There is also disclosed an auxiliary frame secured to the seat and depending therefrom to provide a foot-rest, and, also, through its pivotal connection with the main frame, to have a guiding or steadying function during the up and down movements of the seat under working conditions.

The seat 4 is conveniently provided by means of an oblong member which may be shaped to provide an integral arched element which serves as a handle-bar 5 for the occupant of this seat. The seat is preferably mounted adjacent the rear end of the resilient means which rearwardly extends from the main frame. Leaf springs are employed and, while a single spring member may be used, it is desirable to employ a pair of leaf spring members each composed of an upper leaf 6 and a lower reinforcing leaf 7. These spring members are adapted to be secured to the main frame and rearwardly to project therefrom. One means of so securing these spring members is shown in the drawings which discloses the method of attachment in the case of a well-known type of motorcycle. This type of motorcycle carries a bracket 8 secured to the parts of the main frame 9 of the machine. This bracket is provided with plates 11 positioned upon opposite sides of the rear wheel 12. These plates, in this commercial form of machine have the usual rear springs 13 held between these plates 11 and the lower complementary plates 14, by bolts 15 extending through the two plates and the interposed portions of the rear springs. The plates are also held together by clips 16 clamped together by bolts 17. The spring members of this novel seat-support are adapted to be placed upon the upper face of the brackets 8 and are apertured to receive therethrough the bolts 15. The clips 16 also function to hold the forward portions of the spring members in position on the brackets. Rearwardly extending, the upper leaf 6 and the lower leaf 7 of each spring member are slightly upwardly curved so that at the point of attachment of the seat, the novel spring members are spaced apart from the usual rear springs 13 of the motorcycle.

The lower leaf 7 of each spring member, which is simply a reinforcing leaf, terminates short of the end of the upper leaf 6 as shown in Figure 1. The end portion 18 of each upper leaf 6 is coiled to receive therethrough a bolt 19 suitably secured to the seat 4 whereby the seat has a pivotal mounting upon the spring member.

The seat 4 is provided with yokes 21 having angled portions 22 bolted to the seat. Each yoke 21 forms a mounting for the bolts 19 whereby the seat is secured adjacent the rear end of each spring member.

An auxiliary frame is connected to the seat and to the main frame of the motorcycle. This auxiliary frame comprises uprights 23, each of which is preferably formed integrally with the yoke 21 and depends therefrom. Each upright has an offset portion 24 whereby the uprights may downwardly extend upon either side of the rear wheel and the rear horizontal forks 25 of the motorcycle frame. The lower ends of these uprights 23 carry horizontally projecting foot-rests 26. The auxiliary frame is also provided with pivotal connection at its lower ends with the main frame of the motorcycle. Preferably, the lower ends of the uprights 23 are forked to receive the rear end of the side members 27. The forks of the upright and the rear end portion of the side members are apertured to receive therethrough the reduced portion 28 of the foot-rests 26. The uprights and side members are thus pivotally connected. The side members 27 are convergently curved at their forward portions and are pivotally mounted on the main frame. A convenient means of securing such pivotal connection is by way of the bolt 29 which also serves pivotally to connect the rear forks 25 of the motorcycle frame to the main frame of the motorcycle.

The weight of the occupant is supported by the spring members rearwardly projecting from the main frame. The auxiliary frame, with its pivotal connections to the main frame is movable and yieldable in response to movements of the seat which in turn moves with the spring members whereby the jarring of the motorcycle in travel is effectively lessened or absorbed. The auxiliary frame is of value in providing foot-rests and in steadying the seat during its vibratory movements under working conditions. Further, it should be noted that, as the foot-rests are carried by this auxiliary frame, the rests move with the seat. In constructions in which the rests are fixed to the main frame of a motorcycle, there is a decided relative movement between the resilient supported seat and the foot-rests, much to the discomfort of the seat occupant.

I claim as my invention.

1. In combination with a motorcycle embodying a leaf-spring rear end construction, an auxiliary seat support including a pair of springs arranged side by side and adapted to be attached to the main frame of a motorcycle in superposed relation to the leaf springs of the rear end construction and rearwardly to extend thereover, a seat supported on said pair of springs adjacent the rear ends thereof, and an auxiliary frame depending from said seat and pivotally secured to the main frame.

2. A seat-support for motorcycles including resilient means adapted to be attached to the main frame of a motorcycle and rearwardly to extend therefrom, a seat pivotally supported on said resilient means adjacent the rear end thereof, an auxiliary frame fixedly depending from said seat and serving to maintain the seat operative.

3. A seat support for motorcycles including resilient means adapted to be attached to the main frame of a motorcycle and rearwardly extend therefrom, a seat supported on said resilient means adjacent the rear end thereof, side members adapted to be pivotally secured to the lower portion of the main frame in advance of the rear wheel and rearwardly to extend on either side of the rear wheel to a point substantially central thereof, uprights secured to the free ends of said side members and upwardly extending for attachment to the seat.

4. A seat support for motorcycles including resilient means adapted to be attached to the main frame of a motorcycle and rearwardly to extend therefrom, a seat pivotally supported on said resilient means adjacent the rear end thereof, side members adapted to be pivotally secured to the lower portion of the main frame and rearwardly to extend therefrom on either side of the rear wheel, uprights pivotally secured at their lower ends to the free ends of said side members and fixedly secured at their upper ends to the seat.

5. A seat support for motorcycles including resilient means adapted to be attached to the main frame of a motorcycle and rearwardly to extend therefrom, yoke means secured to the rear of said resilient means, a seat on said yoke, an auxiliary frame directly fixed to and downwardly extending from said yoke means and having pivotal connection with the main frame at its lower portion.

6. A seat support for motorcycles including a pair of springs adapted to be attached to the main frame of a motorcycle and rearwardly to extend therefrom, a seat, spaced yokes depending from the seat and each pivotally secured to the rear end of one of said springs, and an auxiliary frame carried by and depending from each yoke on either side of the rear wheel and having pivotal connection with said main frame.

7. A seat support for motorcycles including resilient means adapted to be attached to the main frame of a motorcycle and rearwardly to extend therefrom, spaced yokes in which the rear of said resilient means is secured, a seat on said yokes, an upright fixed to each yoke and depending therefrom, and means for pivotally connecting the lower ends of the uprights to the main frame of the motorcycle.

8. In combination with the rear leaf springs of a motorcycle frame and the bracket to which they are attached at their forward ends, of auxiliary-seat springs attached to the bracket by the same means of attachment for the leaf springs.

9. In combination with the rear leaf springs of a motorcycle frame and the bracket to which they are attached at their forward ends, of auxiliary-seat springs of leaf form overlying the former leaf springs and normally diverging upwardly therefrom in a rearward direction, a seat supported on the free rear ends of the seat-supporting springs, and means for attaching the several leaf springs together at their forward ends.

In witness whereof, I have hereunto set my hand this 10th day of February, 1921.

JOYCE C. NELSON.